United States Patent [19]

Sprague

[11] 4,413,270

[45] Nov. 1, 1983

[54] MULTIGATE LIGHT VALVE FOR ELECTRO-OPTIC LINE PRINTERS HAVING NON-TELECENTRIC IMAGING SYSTEMS

[75] Inventor: Robert A. Sprague, Saratoga, Calif.

[73] Assignee: Xerox Corporation, Stamford, Conn.

[21] Appl. No.: 249,057

[22] Filed: Mar. 30, 1981

[51] Int. Cl.³ .................... G01D 15/14; G01D 9/42; G02F 1/01

[52] U.S. Cl. .................................. 346/160; 346/108; 350/356

[58] Field of Search ............... 350/356; 346/107 R, 346/108, 153.1, 160

[56] References Cited

U.S. PATENT DOCUMENTS

| 4,125,318 | 11/1978 | Scibor-Rylski | 350/356 |
| 4,281,904 | 8/1981 | Sprague et al. | 350/356 |
| 4,316,196 | 2/1982 | Jacobs | 350/356 X |

OTHER PUBLICATIONS

"Light Gates Give Data Recorder Improved Hardcopy Resolution," *Electronic Design*, Jul. 19, 1979, pp. 31–32.
"Polarizing Filters Plot Analog Waveforms," *Machine Design*, vol. 51, No. 17, Jul. 26, 1979, p. 62.
"Data Recorder Eliminates Problem of Linearity," *Design News*, Feb. 4, 1980, pp. 56–57.

Primary Examiner—Thomas H. Tarcza

[57] ABSTRACT

To reduce the complexity and cost of the optics required for electro-optic line printing and similar functions, a multigate light valve having converging electrodes is illuminated by a light beam which converges toward the entrance pupil of the an imaging lens. The electrodes and the light beam converge toward that point with substantially the same angle of convergence so that the light beam effectively remains longitudinally parallel to the electrodes as it passes through the electro-optic element of the light valve.

9 Claims, 6 Drawing Figures

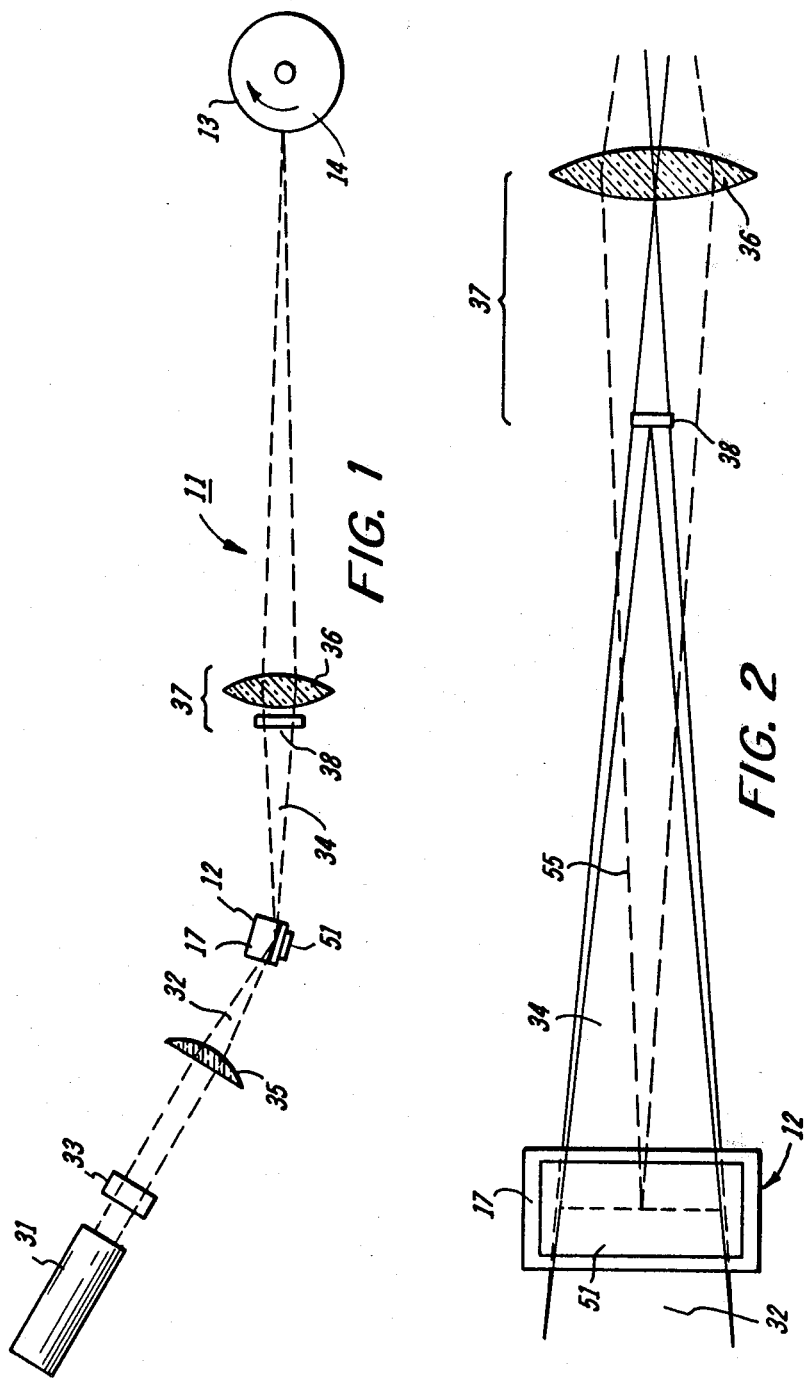

MULTIGATE LIGHT VALVE FOR ELECTRO-OPTIC LINE PRINTERS HAVING NON-TELECENTRIC IMAGING SYSTEMS

FIELD OF THE INVENTION

This invention relates to multigate light valves and, more particularly, to electro-optic line printers and the like having non-telecentric imaging systems.

BACKGROUND OF THE INVENTION

As is known, an electro-optic element having a plurality of individually addressable electrodes may be employed as a multigate light valve in, say, an electro-optic line printer. See a copending and commonly assigned United States patent application of R. A. Sprague et al., which was filed June 21, 1979 under Ser. No. 040,607 now U.S. Pat. No. 4,281,904 on a "TIR Electro-Optic Modulator with Individually Addressable Electrodes". Also see, "Light Gates Give Data Recorder Improved Hardcopy Resolution," *Electronic Design*, July 19, 1979, pp. 31-32; "Polarizing Filters Plot Analog Waveforms,"*Machine Design*, Vol. 51, No. 17, July 26, 1979, p. 62; and "Data Recorder Eliminates Problem of Linearity,"*Design News*, Feb. 4, 1980, pp. 56-57.

Substantial progress has been made in developing such light valves and in applying them to electro-optic line printing. For example, a copending and commonly assigned United States patent application of R. A. Sprague, which was filed Sept. 17, 1980 under Ser. No. 187,911 now U.S. Pat. No. 4,389,659 on an "Electro-Optic Line Printer," shows than an image represented by a serial input data stream may be printed on a standard photosensitive recording medium through the use of a multigate light valve that is illuminated by a more or less conventional light source. That disclosure is of interest primarily because it teaches input data sample and hold techniques for minimizing the output power required of the light source. Another copending and commonly assigned United States patent application of W. D. Turner, which was filed Sept. 17, 1980 under Ser. No. 187,936 on "Proximity Coupled Electro-Optic Devices," reveals that the electrodes and the electo-optic element of a multigate light valve may be physically distinct components which are pressed or otherwise firmly held together to achieve "proximity coupling." Still another copending and commonly assigned United States patent application of R. A. Sprague et al., which was filed Sept. 17, 1980 under Ser. No. 188,171 now U.S. Pat. No. 4,367,925 on "Integrated Electronics for Proximity Coupled Electro-Optic Devices," shows that it is relatively easy to make the necessary electrical connections to the many electrodes of a typical proximity coupled multigate light valve if the electrodes are formed by suitably patterning a metallization layer of, say, a VLSI silicon electrode driver circuit. Furthermore, yet another copending and commonly assigned United States patent application of W. D. Turner et al., which was filed Sept. 17, 1980 under Ser. No. 187,916 on "Differential Encoding for Fringe Field Responsive Electro-Optic Line Printers," teaches that the number of electrodes required of a multigate light valve to enable an electro-optic line printer to achieve a given resolution is reduced by a factor of two if the input data is differentially encoded.

For successful line printing with a multigate light valve of the foregoing type, the zero order diffracted components of the light emerging therefrom are brought to focus at the center of the entrance pupil of an imaging lens (hereinafter simply referred to as the center of the imaging lens) which, in turn, images the light valve onto the recording medium. In other words, the zero order components of the output beam are collected as the principal rays for imaging. This ensures that substantially the same amount of light is collected from each of the many electrode pairs of the electro-optic element and that more or less uniform imaging conditions are maintained across essentially the full width of the light valve.

Prior multigate light valves have generally had parallel electrode geometries. For that reason, the standard practice has been to illuminate such a light valve with an input beam which is collimated in a direction parallel to the electrodes, such that the zero order diffracted components of the output beam emerge along parallel paths which are normal to the light valve. This means tha a telecentric imaging system is needed to collect the zero order diffraction components as the principal rays for imaging (as a matter of definition, a "telecentric imaging system" is one in which all principal rays are normal to the surface of the object being imaged). For example, a field lens is commonly used to bring the zero order light to focus at the center of an imaging lens. Unfortunately, however, the field lens tends to create unwanted field curvature and to introduce undesirable optical abberations. Accordingly, a relatively complex and expensive imaging lens is usually required to obtain a reasonably flat and distortion free image of the light valve in the image plane (i.e., on the suface of the phosensitive recording medium).

SUMMARY OF THE INVENTION

In accordance with the present invention, to reduce the complexity and cost of the optics required for electro-optic line printing and similar functions, a multigate light valve having converging electrodes is illuminated by a light beam which converges toward the center of the entrance pupil of an imaging lens. The electrodes and the light beam converge toward that point at substantially the same angle of convergence so that the light beam effectively remains longitudinally parallel to the electrodes as it passes through the electro-optic element of the light valve.

BRIEF DESCRIPTION OF THE DRAWINGS

Still other features and advantages of this invention will become apparent when the following detailed description is read in conjunction with the attached drawings, in which:

FIG. 1 is a schematic side view of an electro-optic line printer having a non-telecentric imaging sytem in accordance with the present invention;

FIG. 2 is an enlarged plan view of a portion of the printer shown in FIG. 1;

DETAILED DESCRIPTION OF THE ILLUSTRATED EMBODIMENTS

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Turning now to the drawings, and at this point especially to FIGS. 1 and 2, there is an electro-optic line printer 11 having a fringe field responsive multigate light valve 12 for printing an image on a photosensitive recording medium 13. As shown, the recording medium 13 is a photoconductively coated drum 14 which is rotated (by means not shown) in the direction of the arrow. Nevertheless, it will be evident that there are other xerographic and non-xerographic recording media that may be used, including photoconductively coated belts and plates, as well as photosensitive films and coated papers. Thus, in the generalized case, the recording medium 13 should be visualized as being a photosensitive medium which is exposed while advancing in a cross line or line pitch direction relative to the light valve 12.

Figure 3:
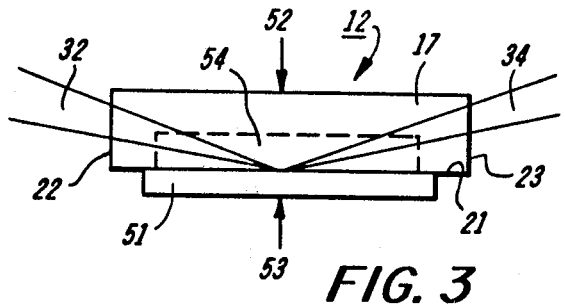
FIG. 3 is an enlarged side view of the TIR light valve used in the line printer shown in FIG. 1.
Figure 4:
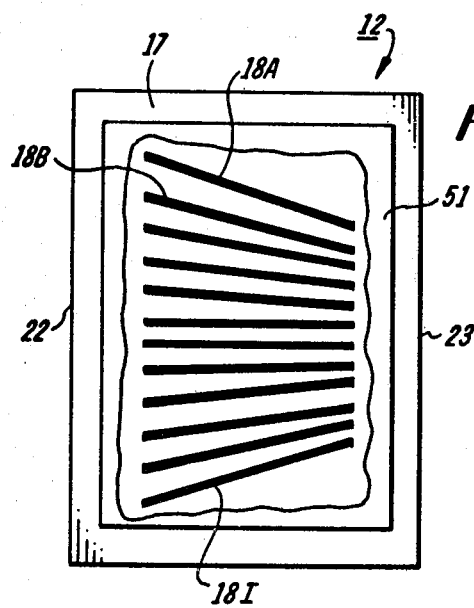
FIG. 4 is an enlarged, cut-away, bottom view of the light valve shown in FIG. 3 to illustrate the converging geometry of its electrodes in keeping with this invention.

As best illustrated in FIGS. 3 and 4, the light valve 12 comprises an optically transparent electro-optic element 17 and a plurality of individually addressable electrodes 18a–18i. The most promising electro-optic materials for such a device presently appear to be $LiNbO_3$ and $LiTaO_3$, but there are others which warrant consideration, including BSN, KDP, $KD^xP$, $Ba_2NaNb_5O_{15}$ and PLZT. In this particular embodiment, the light valve 12 is operated in a Total Internal Reflection (TIR) mode. Consequently, the electro-optic element 17 is suitably a y-cut crystal of, say, $LiNbO_3$ having an optically polished reflecting surface 21 extending between opposed, optically polished input and output faces 22 and 23, respectively.

Concentrating for a moment on FIGS. 1–3, it will be seen that the line printer 11 includes a laser 31 or similar source for supplying an input light beam 32 and a beam expander 33 for laterally expanding the input beam 32 so that it illuminates substantially the full width of the electro-optic element 17. In keeping with accepted practices, to operate the light valve 12 in a TIR mode, the input beam 32 is transmitted through the input face 22 of the electro-optic element 17 at a grazing angle of incidence relative to the reflecting surface 21 (i.e., an angle no greater than the critical angle of incidence for total internal reflectance from the surface 21) and is brought to a wedge shaped focus on that surface approximately midway through the electro-optic element 17. Consequently, the input beam 32 is totally internally reflected from the reflecting surface 21 to provide an output beam 34 which exits from the electro-optic element 17 through its output face 23.

In accordance with the present invention, the input beam 32 is applied to the electro-optic element 17 through one or more lenses 35 which are selected to have different focal powers laterally and longitudinally of the light valve 12. More particularly, the longitudinal focal power of the lenses 35 (i.e., the focal power along the optical axis of the light valve 12) is selected so that the input beam 32 is brought to a wedge shaped focus on the reflecting surface 21, as previously indicated. On the other hand, the lateral focal power of the lenses 35 is selected so that the input beam 32 converges with a predetermined angle of convergence toward the center of the imaging lens 36.

To carry out the present invention, as shown in FIG. 4, the electrodes 18a–18i are more or less uniformly distributed in spaced apart relationship across essentially the full width of the electro-optic element 17 and are oriented to longitudinally converge toward the center of the imaging lens 36 with substantially the same angle of convergence as the input beam 32. As described in more detail hereinbelow, the phase front of the output beam 34 is spatially modulated in accordance with the differentially encoded data samples appearing on the electrodes 18a–18i at any given point in time. Thus, Schlieren central dark field or bright field imaging optics are employed to convert the spatial phase front modulation of the output beam 34 into a correspondingly modulated intensity profile and to supply any magnification needed to obtain an image of the desired size on the recording medium 13. Here, for example, there are central dark field imaging optics 37 comprising the imaging lens 36 and a stop 38. To provide a central dark field, the stop 38 is centered on the entrance pupil of the imaging lens 36.

Since the electrodes 18a–18i and the input beam 32 converge toward the center of the imaging lens 36 at substantially the same angle of convergence (i.e., are locally parallel), the principal rays of the output beam 34 are its zero order diffraction components. The central dark field character of the imaging optics 37 follows from the fact that the zero order diffraction components of the output beam 34 are focused on the stop 38, while its higher order diffraction components scatter around the stop 38 and are collected by the imaging lens 36. Thus, the imaging lens 36 focuses the higher order diffraction components of the output beam 34 on the recording medium 13, thereby providing an intensity modulated image of the light valve 12.

Figure 5:
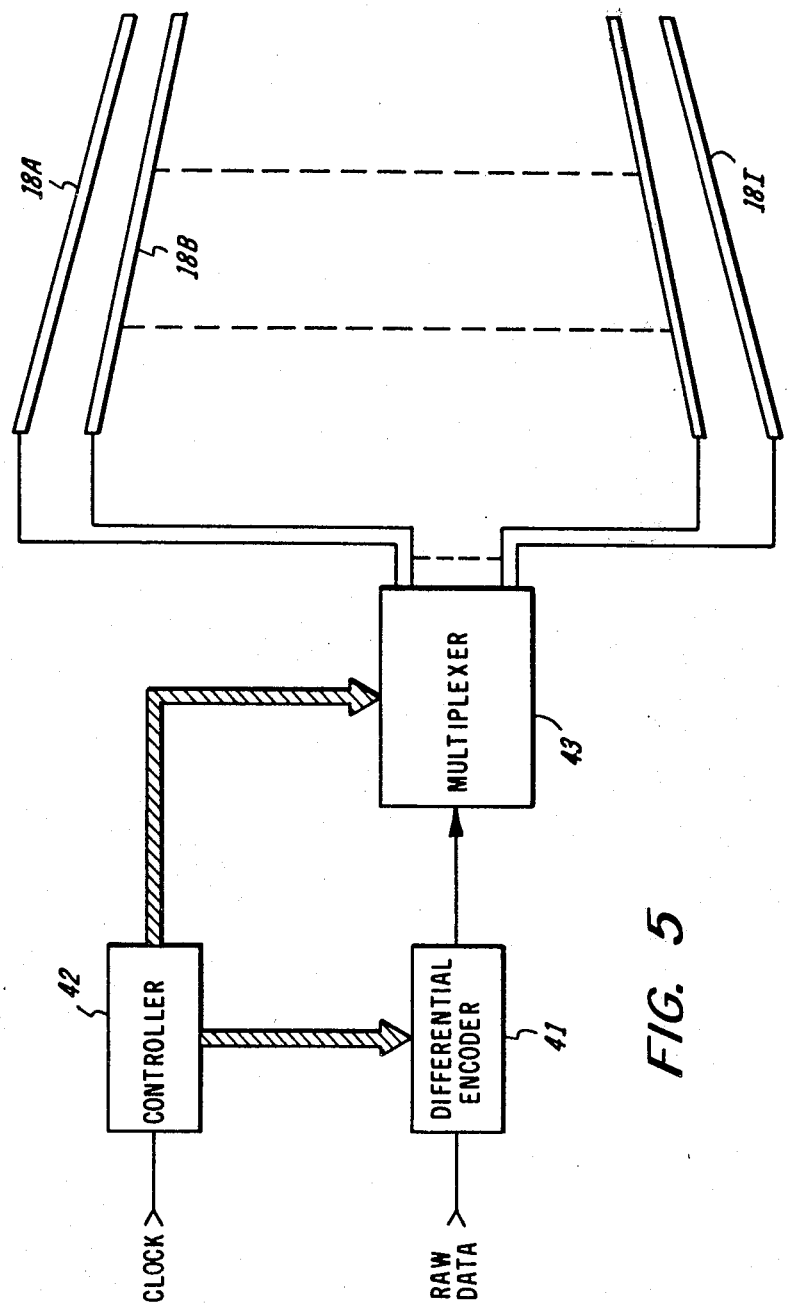
FIG. 5 is a simplified block diagram of a system for applying differentially encoded input data samples to the individually addressable electrodes of the light valve shown in FIG. 4.

Referring now to FIG. 5, to perform line printing, serial input data samples, which represent picture elements for successive lines of an image, are applied to a differential encoder 41 at a predetermined data rate. The encoder 41 differentially encodes the input samples on a line-by-line basis in response to control signals from a controller 42, and a multiplexer 43 responds to further control signals from the controller 42 to ripple the encoded data samples onto the electrodes 18a–18i at a ripple rate which is matched to the data rate. The input data may, of course, be buffered (by means not shown) to match the input data rate to any desired ripple rate. Moreover, the input data may be processed (by means also not shown) upstream of the encoder 41 for text editing, formatting or other purposes, provided that the data samples for the ultimate image are applied to the encoder 41 in adjacent picture element sequence. See, for example, a commonly assigned United States patent application of William Gunning et al., which was filed Apr. 5, 1978 under Ser. No. 893,658.

Differential encoding is described in substantial detail in the aforementioned Turner et al. application on "Differential Encoding for Fringe Field Responsive Electro-Optic Line Printers." Nevertheless, it may be helpful to mention that, as a matter of definition, each differentially encoded data sample, other than the first sample for each line of the image, has a magnitude whose difference from the previous differentially encoded data sample corresponds to the magnitude of a respective input data sample. The first sample for each line of the image is referenced to a common reference potential, such as ground. Thus, all picture elements are faithfully represented by the electrode to electrode voltage drops that are produced in response to the differentially encoded data.

Returning to FIGS. 1-4, it will be understood that the electrode to electrode voltage drops appearing between the electrodes 18a-18i create localized fringe fields. To couple these fields into the electro-optic element 17 of the light valve 12, the electrodes 18a-18i are supported on or very near its reflecting surface 21. For example, as shown, the electrodes 18a-18i are defined by suitably patterning a metallization layer of, say, a VLSI silicon circuit 51. Furthermore, the silicon circuit 51 is pressed or otherwise firmly held against the electro-optic element 17, as indicated by the arrows 52 and 53 (FIG. 3), to maintain the electrodes in contact with or closely adjacent to the reflecting surface 21. The advantage of this construction is that the silicon circuit 51 may be used to make the necessary electrical connections to the electrodes 18a-18i.

The fields coupled into the electro-optic element 17 cause localized variations in its refractive index widthwise of an interaction region 54 (FIG. 3). Inasmuch as the electrode-to-electrode voltage drops are equal to the magnitudes of successive ones of the raw input data samples relative to, say, ground, the magnitude of the refractive index variations which are produced in response to the encoded data samples for any given line of the image faithfully represent the raw input data samples for that line. Consequently, the phase front of the output beam 34 is sequentially spatially modulated in accordance with sets of data samples for successive lines of the image. As previously mentioned, the Schlieren optics 37 convert the phase front modulation of the output beam 34 into a corresponding intensity profile.

In summary, as indicated in FIG. 2 by the broken lines 55, each adjacent pair of electrodes, such as 18a and 18b (FIG. 4), cooperates with the electro-optic element 17 and with the imaging optics 37 to effectively define a local modulator for creating a picture element at a unique, spatially predetermined position along each line of the image. Since the input data is differentially encoded and all of the electrodes 18a-18i are individually addressable, the number of picture elements that can be printed/scan line is equal to the number of electrodes 18a-18i. Moreover, since the focusing lens or lenses 35 are on the input side of the light valve 12, they contrubute relatively little curvature or distortion to the image.

Figure 6:
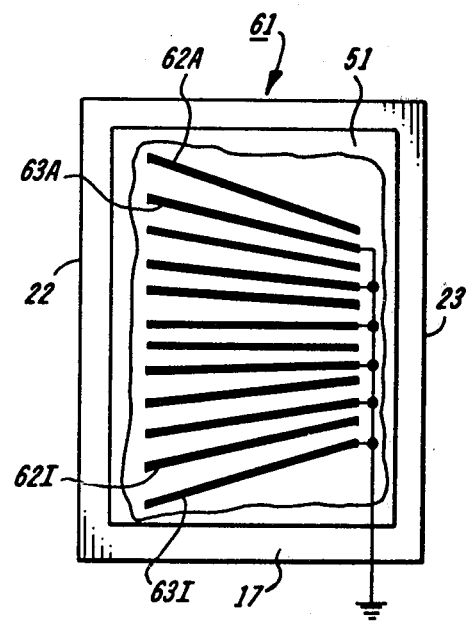
FIG. 6 is an enlarged, cut-away bottom view of a TIR light valve having a converging set of individually addressable electrodes interleaved with a converging set of reference plane electrodes in accordance with an alternative embodiment of the present invention.

Turning to the alternative embodiment shown in FIG. 6, it will be evident that the principals of the present invention may also be applied to a light valve 61 having a plurality of individually addressable electrodes 62a-62i alternating with a corresponding plurality of reference or ground plane electrodes 63a-63i. As compared with the embodiment shown in FIGS. 1-5, the major advantage of this embodiment is that the raw input data is directly applied to the individually addressable electrodes 62a-62i so as to avoid the additional cost and complexity of differential encoding, and its basic disadvantage is that twice as many electrodes are required to print a given number of picture elements/line.

Indeed, this alternative embodiment is otherwise so similar to the embodiment described hereinabove that it need not be described in any further detail. Instead, like reference numerals have been used to identify like parts.

CONCLUSION

In view of the foregoing, it will be appeciated that the present invention provides multigate light valves which are compatible with non-telecentric imaging systems. Moreover, it will be understood that such a light valve is especially well suited for use in electro-optic line printers.

What is claimed is:

1. An optical system comprising
    a multigate light valve including an electro-optic element, and a plurality of electrodes distributed in spaced apart relationship across substantially the full width of said electro-optic element for applying localized electric fields to said electro-optic element;
    means for applying a converging light beam to said electro-optic element, said light beam illuminating substantially the full width of said electro-optic element and converging toward a predetermined point with a predetermined angle of convergence;
    said electrodes converging toward said predetermined point at substantially the same angle of convergence as said light beam, whereby said light valve may be imaged onto an image plane by non-telecentric imaging optics.

2. The optical system of claim 1 wherein
    all of said electrodes are individually addressable; and said light valve further includes
    a separate substrate for supporting said electrodes, and
    means for holding said substrate against said electro-optic element, whereby said electrodes are maintained closely adjacent to said electro-optic element.

3. The optical system of claim 1 wherein
    said electrodes comprise a plurality of individually addressable electrodes and a plurality of reference plane electrodes, and
    said individually addressable electrodes are interleaved with said reference plane electrodes in alternating relationship; and said light valve further includes
    a separate substrate for supporting said electrodes, and
    means for holding said substrate against said electro-optic element, whereby said electrodes are maintained closely adjacent to said electro-optic element.

4. The optical system of claim 1 wherein
    said electro-optic element has an optically polished reflecting surface,
    said electrodes are adjacent said reflecting surface,
    said light beam is applied to said electro-optic element at a grazing angle of incidence relative to said reflecting surface for a TIR mode of operation of said light valve, and
    said means for applying said light beams includes lens means having a focal power longitudinally of said light valve which is selected to bring said light beam to a wedged shaped focus on said reflecting surface and a focal power laterally of said light valve which is selected to cause said light beam to converge toward said predetermined point with said predetermined angle of convergence.

5. An electro-optic line printer comprising
a multigate light valve,
a photosensitive recording medium which advances in a cross line direction relative to said light valve,
non-telecentric imaging optics for imaging said light valve onto said recording medium, said imaging optics having a predetermined entrance pupil, and
means for illuminating said light valve with a light beam which converges toward said entrance pupil with a predetermined angle of convergence.

6. The line printer of claim 5 wherein
said light valve includes
an electro-optic element, and
a plurality of electrodes;
said electrodes being maintained closely adjacent said electro-optic element and longitudinally converging toward said entrance pupil substantially with said predetermined angle of convergence.

7. The line printer of claim 6 wherein
said electro-optic element has an optically polished reflecting surface,
said electrodes are adjacent said reflecting surface,
said light beam is applied to said electro-optic element at a grazing angle of incidence relative to said reflecting surface for a TIR mode of operation of said light valve, and
said illuminating means includes lens means having a focal power longitudinally of said light valve which is selected to bring said light beam to a wedged shaped focus on said reflecting surface and a focal power laterally of said light valve which is selected to cause said light beam to converge toward the entrance pupil of said imaging optics with said predetermined angle of convergence.

8. The line printer of claim 7 wherein
all of said electrodes are individually addressable; and said light valve further includes
a separate substrate for supporting said electrodes, and
means for holding said substrate against said electro-optic element, whereby said electrodes are maintained closely adjacent to said electro-optic element.

9. The line printer of claim 7 wherein
said electrodes comprise a plurality of individually addressable electrodes and a plurality of reference plane electrodes, and
said individually addressable electrodes are interleaved with said reference plane electrodes in alternating relationship; and said light valve further includes
a separate substrate for supporting said electrodes, and
means for holding said substrate against said electro-optic element, whereby said electrodes are maintained closely adjacent to said electro-optic element.

* * * * *